No Printed Specification Available
7380X
U. Smith
Making Cube Sugar.
Patented Jan. 21, 1833.
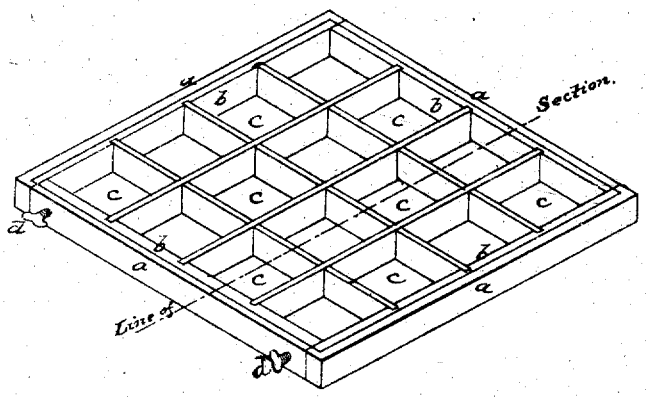
References.
a. Outside frame
b. Inside rills.
c Moulds.
d. Thumb screws.
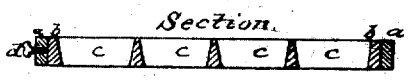

7380X Jan 21, 1833 Arr 11 381

Uriel Smith. Sandisfield Mass.

Letters Patent.

The Schedule referred to in these Letters Patent and making part of the same containing a description in the words of the said Uriel Smith himself of his improvement in baking Sugar.

---

To all to whom these presents shall come.

Be it known that I Uriel Smith of Sandisfield in the County of Berkshire & State of Massachusetts, have invented a new & useful improvement in the baking of Sugar, and that the following is a full & exact description of the construction & operation of the said machine as invented or improved by me.

The Machine or moulds are enclosed in a square or frame of equal or unequal sides, & may be constructed either of metal or wood with or without bottoms attached to them & are divided into apartments by partitions crossing each other at right angles. .... The size of the apartments may be varied to correspond with the weight of the cakes desired to be produced.
The under sides of the partitions are to be made thicker than the upper; that the cakes may more readily drop from the moulds when turned bottom upwards.

The moulds when used may be moistened with oil or water to prevent the sugar from adhering to them.

If the moulds are used without bottoms attached, a damp cloth may be spread on a smooth level surface, upon which place the moulds and confine them at or near the corners of the frames by buttons or screws, so that by turning them the moulds may be confined & released at pleasure.

The sugar when in a proper state for baking is turned into the moulds & the apartments filled; when suitably cool to receive & retain an impression may be stamped with such figure 288. 7380 X figure as is desired; when sufficiently hard, by cooling the moulds are taken up, turned over & cleared of the cakes and then put into water to melt off the sugar if any so adheres to them.

Unice Smith

Witnesses
Geo. Hull
Edmund Hull 363 wds

Cl
Cl/W.

(Patented 21 Jany 1833)
Drawn port folio